United States Patent [19]

Harpenau

[11] Patent Number: 5,476,183
[45] Date of Patent: Dec. 19, 1995

[54] RECESSED DRYER VENT ROUGH-IN BOX

[76] Inventor: Richard J. Harpenau, 17368 SE. Conch Bar Ave., Tequesta, Fla. 33469

[21] Appl. No.: 234,123

[22] Filed: Apr. 28, 1994

[51] Int. Cl.⁶ .................................. H02G 3/08; F16L 5/00
[52] U.S. Cl. ............................ 220/3.3; 220/447; 137/360
[58] Field of Search .............................. 220/3.2, 3.3, 3.4, 220/3.94, 477; 137/360

[56] References Cited

U.S. PATENT DOCUMENTS

| | | | |
|---|---|---|---|
| D. 277,131 | 1/1985 | Shames et al. | D23/151 |
| 3,847,175 | 11/1974 | Anderson | 137/360 |
| 4,673,097 | 6/1987 | Schuldt | 220/3.2 |
| 5,121,948 | 6/1992 | Anderson et al. | 285/168 |
| 5,158,328 | 10/1992 | Anderson et al. | 285/168 |
| 5,191,171 | 3/1993 | Bordwell | 220/3.2 |
| 5,287,665 | 2/1994 | Rath, Jr. | 220/3.3 |

*Primary Examiner*—Stephen F. Gerrity
*Assistant Examiner*—Reginald L. Alexander
*Attorney, Agent, or Firm*—Richard L. Miller

[57] ABSTRACT

A dryer rough-in box, comprising planar surfaces including a top, a bottom, a pair of sides and a back. The top and bottom are parallel, as are the pair of sides. The top and bottom extend between and are perpendicular to the sides. The sides are perpendicular to the back. The dryer rough-in box has typically a plurality of ports, for allowing a dryer exhaust vent duct pass therethrough, for allowing flexibility of installation configurations. The box has a lip, for mounting the dryer rough-in box to studs in a wall. The dryer rough-in box permits a dryer to be placed in close proximity to a wall by creating a space for the dryer hose to fit when accordion upon it self.

6 Claims, 1 Drawing Sheet

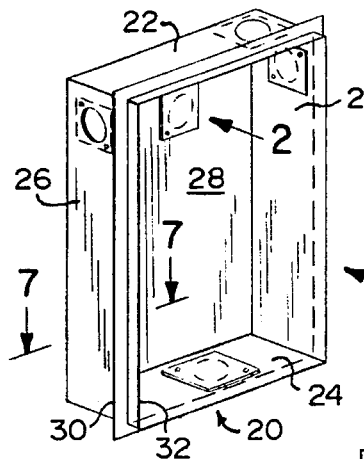
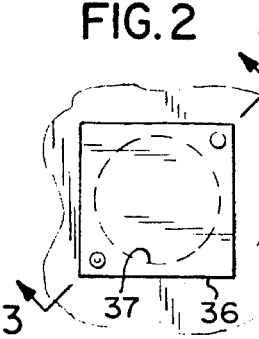
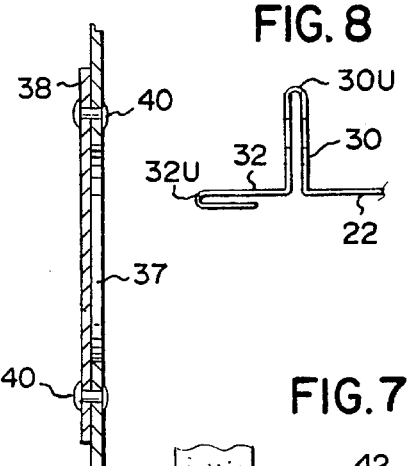
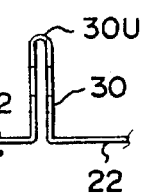
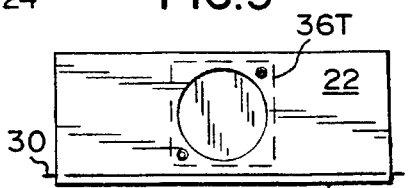
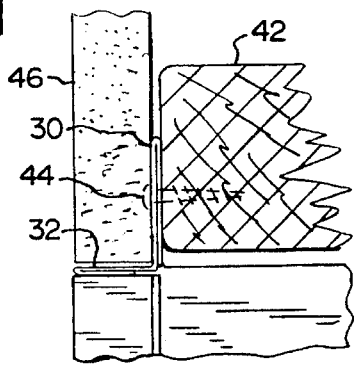
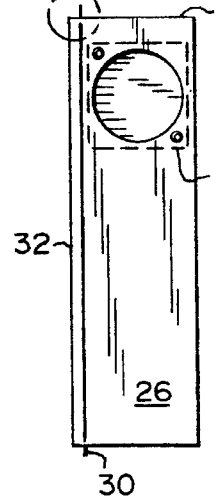
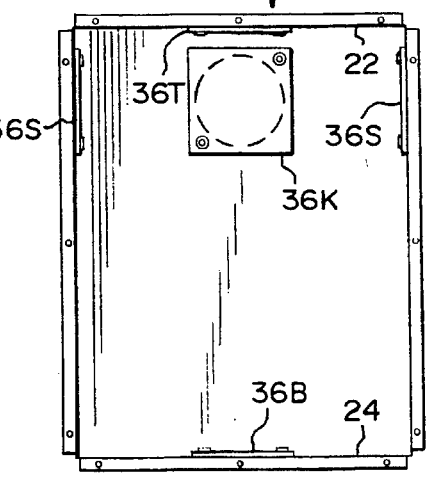
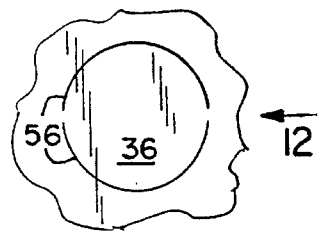
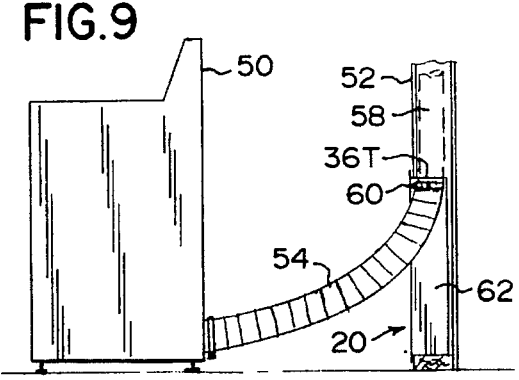
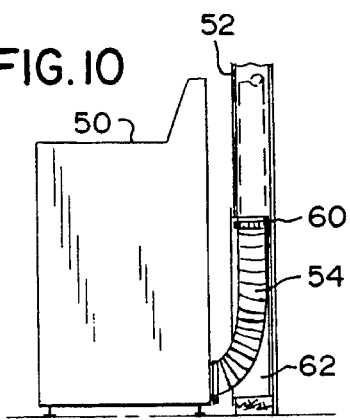
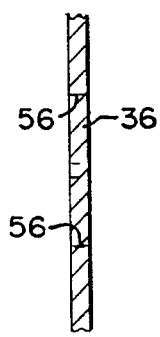

RECESSED DRYER VENT ROUGH-IN BOX

BACKGROUND OF THE INVENTION

The invention relates to a recessed dryer vent rough-in box. More particularly, the invention relates to a rough-in box that is installed in a house prior to the drywall stage for later use in connecting and installing a clothes dryer.

When a clothes dryer is installed in a building, a connection is usually made between a metal vent leading to the outside, and a flexible hose attached to the dryer. This connection is usually made outside of the wall, and requires approximately three tight bends of the flexible hose. The flexible hose tends to kink at these bends, resulting in constricted air flow, a clogged hose, poor dryer performance. In addition, the tubing is unsightly, and requires that the dryer be kept a distance away from the wall.

U.S. Pat. No. 3,847,175 to Anderson, discloses a universal installation box for use in dryer vent systems and in water supply and drain systems.

U.S. Pat. No. 5,121,948 to Anderson et al., discloses a dryer duct and vent assembly including flexible duct portions.

U.S. Pat. No. 5,158,328 to Anderson et al., discloses a universal duct elbow and connector plate.

U.S. Pat. No. 277,131 to Shames et al., discloses a housing for a clothes dryer vent.

While these units may be suitable for the particular purpose employed, or for general use, they would not be as suitable for the purposes of the present invention as disclosed hereafter.

SUMMARY OF THE INVENTION

It is an object of the invention to produce a dryer rough-in box that, once installed in a building wall, allows a dryer to be easily and cleanly installed therein.

It is another object of the invention to produce a dryer rough-in box that prevents unnecessary bends in the dryer vent hose.

It is a further object of the invention to produce a dryer rough-in box that allows flexibility of installation schemes.

It is a still further object of the invention to produce a dryer rough-in box that allows a dryer to be placed in close proximity to the wall in which the rough-in box is installed.

The invention is a dryer rough-in box, comprising planar surfaces including a top, a bottom, a pair of sides and a back. The top and bottom are parallel, as are the pair of sides. The top and bottom extend between and are perpendicular to the sides. The sides are perpendicular to the back. The dryer rough-in box has a plurality of ports, for allowing a dryer hose to pass therethrough, for allowing flexibility of installation configurations. The box has a lip, for mounting the dryer roughin box to studs in a wall.

To the accomplishment of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like reference numerals depict like elements throughout the several views. The drawings are briefly described below.

FIG. 1 is a diagrammatic perspective view of a first embodiment of the instant invention per se.

FIG. 2 is an enlarged plan view of a port taken in the direction of arrow 2 in FIG. 1, with parts broken away.

FIG. 3 is a cross sectional view taken on line 3—3 of FIG. 2.

FIG. 4 is an enlarged front elevational view taken in the direction of arrow 4 in FIG. 1 of the instant invention per se.

FIG. 5 is a plan view taken in the direction of arrow 5 in FIG. 4.

FIG. 6 is a plan view taken in the direction of arrow 6 in FIG. 4.

FIG. 7 is an enlarged diagrammatic cross sectional view taken on line 7—7 in FIG. 1 of the instant invention installed in a typical wall, with parts broken away.

FIG. 8 is an enlarged cross sectional view, with parts broken away, taken in the area of the dotted circle indicated by arrow 8 in FIG. 6.

FIG. 9 is a diagrammatic side elevational view, illustrating a dryer utilizing the instant invention pulled away from the wall.

FIG. 10 is a diagrammatic side elevational view similar to FIG. 9, but with the dryer pushed against the wall.

FIG. 11 is an enlarged plan view similar to FIG. 2, of an alternate embodiment of the port.

FIG. 12 is an enlarged sectional view taken in the direction of arrow 12 in FIG. 11.

DETAILED DESCRIPTION OF THE PREFERRED EMBODIMENTS

FIG 1 illustrates a dryer vent rough-in box 20. The rough-in box 20 is in the shape of a rectangular prism, and has several planar surfaces, including a top 22 a bottom 24, a pair of sides 26 and a back 28. The top 22 and bottom 24 are parallel to one another, and perpendicular to the back 28. The pair of sides 26 are parallel to one another, and are perpendicular to the back 28. The sides 26 each extend between the top 22 and bottom 24. The sides are perpendicular to both the top 22 and bottom 24. The top 22, bottom 24, sides 26 and back 28 define a box space.

The rough in-box has a lip 30, extending in a rectangular path perpendicularly from the top 22, the bottom 24, and the sides 26, opposite the back 28. The lip 30 extends in a direction away from the box space, but parallel to the back 28. The lip 30 allows the box to be mounted or screwed to between studs in a wall in which the rough-in box is to be installed. The distance between the back 28 and the lip 30 should approximate the depth of a stud in the wall in which the rough-in box is to be installed. The distance between the sides 26 defines a width of the box. The width of the box should approximate the distance of adjacent surfaces between studs in the wall in which the rough-in box is to be installed. Typically, the distance between studs is 14½ or 22½ inches, but lesser widths could be useful due to particular framing in area behind dryer.

The lip 30 has a lip extension 32, which extends from the lip 30 to shoulder a section of dry wall with the lip 30. The lip extension 32 therefore extends from the lip 30 a distance approximately equal to the thickness of dry wall material which is to be installed around the rough-in box 20. The lip extension 32 is substantially parallel and in the same planes as the top 22, bottom 24, and sides 26.

Referring to FIG. 2, the box has a plurality of ports 36 for allowing flexibility of installation configurations. The port has a port hole 37, illustrated in dotted line, which comprises a bore in the box 20. The port hole 37 may be covered with a cover plate 38, which is attached to the box 20 with fasteners, typically screws not illustrated or rivets 40, as illustrated in FIG. 3. Each port hole 37 is approximately the size of a standard dryer hose, typically 4 inches in diameter, for allowing the dryer exhaust vent duct 58 to pass through the port into the box space. To use the port hole 37, the associated cover plate 38 is detached by removing the rivets 40. The rivets 40 may be removed by breaking them with a chisel, or drilling through them, or screws may be removed with a screw driver.

FIG. 4 illustrates the position of the ports 36 on the box 20. A top port 36T is centered on the top 22. Side ports 36S are located on the sides 26 near the top 22. A back port 36K is located on the back 28, near the top 22. A bottom port 36B is centered on the bottom 24.

Shown in FIG. 5 and FIG. 6, top port 36T is centered on the top 22 of the box 20, and the side ports 36S are located on the sides 26 near the top 22. It is to be noted that the number and location of the ports illustrated are only typical and that there is an infinite variation that may be selected as a matter of design choice. Also illustrated in FIG. 5 and FIG. 6 are the lip 30 and lip extensions 32.

FIG. 7 illustrates how the rough-in box 20 is installed. The box 20 is secured to a stud 42 with a fastening device 44. A section of dry wall 46 is shouldered by the lip 30 and the lip extension 32.

FIG. 8 illustrates the lip 30, extending perpendicularly from the top 22, and lip extension 32, extending perpendicularly from the lip 30. The lip extension comprises a lip u-bend 30U, and the lip extension comprises a lip extension u-bend 32U. The lip 30 and lip extension 32 having the lip u-bend 30U and lip extension u-bend 32U can therefore be made from a single piece of metal.

FIG. 9 illustrates a clothes dryer 50, pulled away from a wall 52 in which the rough-in box 20 is installed. A dryer hose 54 extends into the bottom port 36B.

FIG. 10 illustrates the clothes dryer 50 of FIG. 9, pushed up close to the wall 52. Even while the dryer 50 is in close proximity to the wall 52, the dryer hose 54 is able to undergo a gradual bend within the space between the studs 42 in the wall 52. The dryer hose 54 is appropriately able to accordion to a shorter length and fit with in the space 62 defined inside the rough-in box 20.

FIG. 11 illustrates an alternate embodiment, in which the ports 36 have semi-circular score marks 56. The semi-circular score marks 56 allow a portion of the port 36 to be "knocked-out" to form the port holes 37 wherever desired for the intended installation configuration.

In operative use the dryer rough-in box 20 is secured in the wall between studs 42 and an exhaust vent duct 58 is installed between the rough-in box and an appropriate discharge point from the building. Enough of the exhaust vent duct 58 is allowed to protrude into the rough-in box through a convenient port so that at a later time the dryer hose may accordingly be attached to the protruding portion of the exhaust vent duct 58 with tape or an appropriate hose clamp 60 as desired at the time the dryer is installed.

What is claimed is:

1. A dryer rough-in installation box, for installing a clothes dryer having a dryer hose in a wall having studs and a distance between the studs, comprising:

a) planar surfaces including a top, a bottom parallel to the top, a back, and a pair of sides parallel to one another and perpendicular to the back, the sides each extending perpendicular to and between the top and bottom, a box space is defined by the top, bottom, sides, and back;

b) at least one port, said port being in a location selected from the top, bottom, sides, and back, said port capable of allowing a dryer exhaust vent duct to pass through the port into the box space; and c) a lip extending perpendicularly from the sides, for allowing the box to be mounted between two studs, wherein said lid further comprises lip extensions, extending perpendicularly from the lip, away from the box space, for shouldering a section of drywall, wherein each port further comprises a cover plate, attached to the box with rivets.

2. The apparatus as recited in claim 1, wherein a port is located at the back.

3. The apparatus as recited in claim 1, wherein a port is located on at least one of the sides.

4. The apparatus as recited in claim 1, where a port is located at the top.

5. The apparatus as recited in claim 1, where a port is located at the bottom.

6. The apparatus as recited in claim 1, wherein the lip further comprises a lip u-bend, so that the lip and lip extension may be comprised of a single piece of material.

* * * * *